United States Patent [19]

Robertson et al.

[11] Patent Number: 5,134,876
[45] Date of Patent: Aug. 4, 1992

[54] ACOUSTIC EMISSION LEAK SIMULATOR

[75] Inventors: Michael O. Robertson, Hurt; Charles B. Overby, Gladys, both of Va.

[73] Assignee: The Babcock & Wilcox Company, New Orleans, La.

[21] Appl. No.: 726,465

[22] Filed: Jul. 8, 1991

[51] Int. Cl.$^5$ ............................................ G01M 3/24
[52] U.S. Cl. .................. 73/40.5 A; 73/1 R; 73/592
[58] Field of Search ............ 73/37, 37.5, 1 R, 40.5 R, 73/592, 40.5 A, 49.1; 376/252

[56] References Cited

U.S. PATENT DOCUMENTS

| | | | |
|---|---|---|---|
| 4,013,905 | 3/1977 | Breneman et al. | 310/8.3 |
| 4,176,543 | 12/1979 | Nolte et al. | 73/40.5 |
| 4,179,940 | 12/1979 | Oertle et al. | 73/808 |
| 4,201,092 | 5/1980 | Dau | 73/587 |
| 4,202,202 | 5/1980 | Yagisawa | 73/40 |
| 4,304,135 | 12/1981 | Peterson et al. | 73/799 |
| 4,410,484 | 10/1983 | Marini et al. | 376/252 |
| 4,428,236 | 1/1984 | Votava et al. | 73/587 |
| 4,457,163 | 7/1984 | Jäckle | 73/40.5 |
| 4,503,710 | 3/1985 | Oertle et al. | 73/763 |
| 4,571,994 | 2/1986 | Dickey et al. | 73/168 |
| 4,609,994 | 9/1986 | Bassim et al. | 364/551 |
| 4,736,622 | 4/1988 | Miller et al. | 73/49.2 |
| 4,736,623 | 4/1988 | Brown et al. | 73/49.2 |
| 4,785,659 | 11/1988 | Rose et al. | 73/40.5 |
| 4,813,269 | 3/1989 | Brown et al. | 73/49.2 |
| 4,813,277 | 3/1989 | Miller et al. | 73/49.2 |
| 4,813,284 | 3/1989 | Miller et al. | 73/49.2 |
| 4,813,285 | 3/1989 | Brown et al. | 73/49.2 |
| 4,858,462 | 8/1989 | Coulter et al. | 73/40.5 |
| 4,979,820 | 12/1990 | Shakkottai et al. | 356/129 |
| 4,991,426 | 2/1991 | Evans | 73/40.7 |

FOREIGN PATENT DOCUMENTS

| | | |
|---|---|---|
| 0152415 | 7/1980 | Fed. Rep. of Germany. |
| 54-136416 | 10/1979 | Japan. |
| 55-87022 | 7/1980 | Japan. |
| 59-67439 | 4/1984 | Japan. |
| 0120838 | 7/1984 | Japan ......................... 73/40.5 A |
| 62-43534 | 2/1987 | Japan. |
| 1368685 | 8/1986 | U.S.S.R. . |

OTHER PUBLICATIONS

Eisenblatter, Jr., Jax, P., "Acoustic Emission Analysis as a Means of Locating Defects and Finding Leaks in Large Vessels and Pipework", VGB Kraftwerkstechnick, vol. 56, No. 7, pp. 414-417, Jul. 1976.
Smith, J. R., Rao, D. M., Wassel, W. W., "Advances in Acoustic Leak Monitoring Instrumentation", IEEE Trans. on Nucl. Sci., vol. NS-30, No. 1, pp. 825-832, Feb. 1983.
Jax, P., "Flaw Detection and Leak Testing in Components During Internal Pressure Loading With the Help of Acoustic Emission Analysis", Proc. Acoustic Emission Conf., Bad Neuheim, W. Germany, pp. 355-383, Apr. 1979.
Babcock & Wilcox, Products and Services, Acoustic Leak Detection System.
Nondestructive Testing Handbook, 2nd Ed., vol. 5, Part 2, Locating Sources Continuous Acoustic Emission, American Society for Nondestructive Testing, 1987, pp. 137 & 144.
Stevens, D. M. et al., "Acoustic Leak Detection in Fossil Boilers".
Industrial Heating, May 1986, p. 52.

Primary Examiner—Hezron E. Williams
Assistant Examiner—Michael J. Brock
Attorney, Agent, or Firm—Vytas R. Matas; Robert J. Edwards; Daniel S. Kalka

[57] ABSTRACT

An acoustic emission leak simulator (10) for a nondestructive simulation of a leak in a structure employs a fluid supply with variable orifice (18) for controllably releasing the fluid to create a simulated leak source (20). An acoustic waveguide (22) acoustically coupled to the variable orifice (18) couples the sound waves into the structure (12) for simulation of a leak signal. Transducer (30) positioned at a predetermined distance from the simulated leak source (20) characterize the leak signals for a leak detection system.

9 Claims, 2 Drawing Sheets

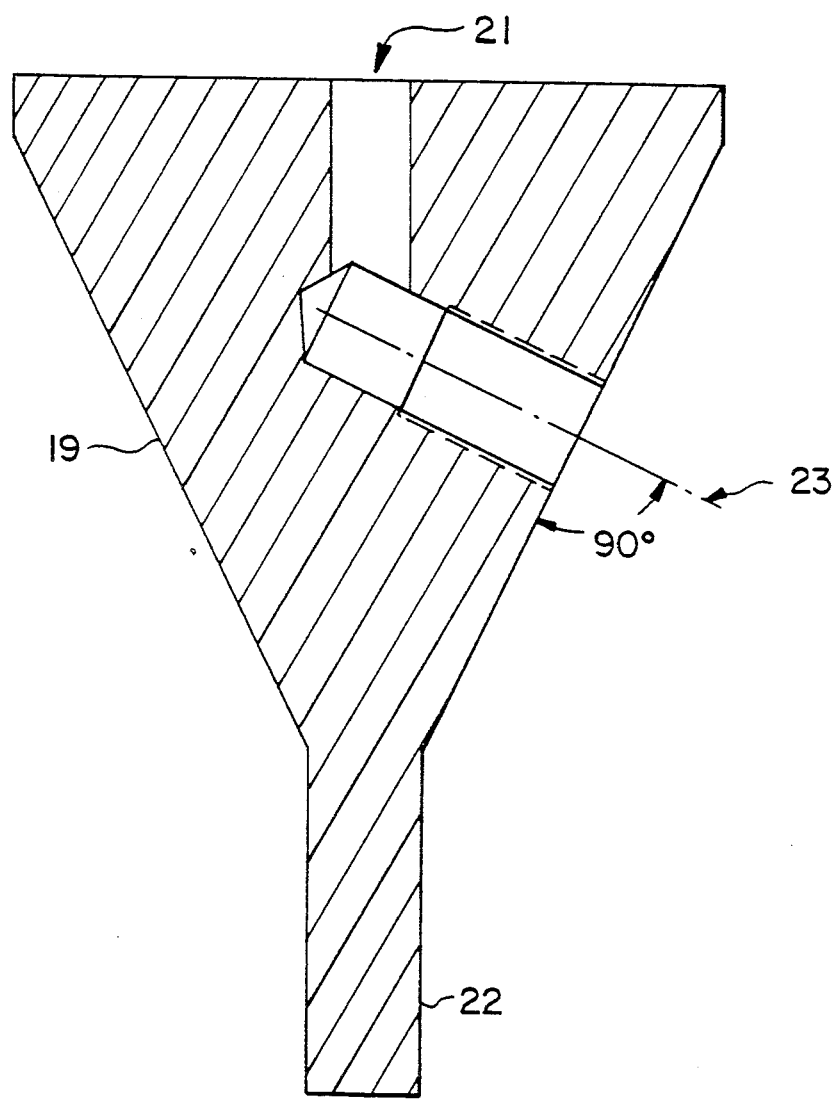

ACOUSTIC EMISSION LEAK SIMULATOR

BACKGROUND OF THE INVENTION

1. Field of the Invention

The present invention relates in general to acoustic emission leak detection systems, and, in particular, to an acoustic emission (AE) leak simulator for calibrating and/or characterizing current acoustic emission leak detection systems for verification of their integrity.

2. Description of the Related Art

In recent years, an increasing amount of interest has been shown by utilities in the capability for early leak detection in high pressure components, such as boiler waterwalls, steam lines or high pressure feedwater heaters. Consequently, utilities have purchased and installed acoustic leak detection systems. Presently, there are two basic routes to detect leakage in various pressure components. In the furnace and convection pass areas of boilers, audible airborne (20 Hz–20 kHz) noise level tracking has shown great success. For steam lines, feedwater heaters, and cyclone boilers, high frequency structure-borne (50 kHz–1 MHz) noise level tracking is more prominent.

For the airborne leak detection systems, trouble-shooting of the installations as well as periodic calibrations are enabled by artificial airborne leak sound wave generators.

However, there currently is no structure-borne analog for the air-borne leak simulator. Thus, it is not possible to directly prove that structure-borne systems are operating properly and detect a leak of a certain size at a given distance prior to an actual leak incident. In addition, it is quite difficult to develop new applications since sensor spacing essentially remains guess work.

An article titled "Advances in Acoustic Leak Monitoring Instrumentation", *IEEE Trans. on Nucl. Sci.*, Vol. NS-30, No. 1, pp. 825-832, February, 1983, describes a method of testing a system or simulation. It discusses an air jet testing procedure where a small nozzle directs air or some other gas at the pipe's surface to generate a wide band, random noise acoustic signal. The root means square (RMS) voltage output of the sensor under test is then recorded as the measure of absolute sensitivity.

Accordingly, there is a need for an acoustic emission leak simulator which adequately characterizes current structure-borne leak detection systems to verify their integrity. It should also provide sensor spacings in new applications.

SUMMARY OF THE INVENTION

The present invention solves the aforementioned problems with the prior art as well as others by providing a method and apparatus for acoustic emission leak simulation.

The present invention resides in a nondestructive simulation of a leak in a structure by providing a fluid supply with variable means for controllably releasing some or all of the fluid from the fluid supply to create a simulated leak source. An acoustic waveguide coupled to the variable means receives the sound waves generated therefrom and couples the sound waves into the structure to simulate a leak signal. Detecting means positioned at a predetermined distance away from the simulated leak source detect the leak signal in the structure and allow for characterizing and/or calibrating a leak detection system. In this manner, an existing leak detection system may be evaluated for its integrity, or in new applications, it establishes an optimum sensor spacing arrangement.

In one embodiment of the present invention the acoustic waveguide is welded to the structure to be tested. In another embodiment, the acoustic waveguide is magnetically secured to the structure.

An object of the present invention is to provide a leak simulating device for calibration, trouble-shooting, and overall checkout of an acoustic leak detection system.

Another object of the present invention is to provide a characterization of a structure-borne leak detection system which enables proper arrangement of sensor spacings in new applications.

Still another object of the present invention is to provide a method for non-destructive simulation of a leak in a structure.

Advantageously, the present invention provides the above objects as well as others with an apparatus that is simple in design, rugged in construction, and economical to manufacture yet withstanding the harsh conditions of high pressure components.

The various features of novelty characterized in the present invention are pointed out with particularity in the claims annexed to and forming a part of this disclosure. For a better understanding of the invention, the operating advantages attained by its use, reference is made to the accompanying drawings and descriptive matter in which the preferred embodiment of the present invention is illustrated.

BRIEF DESCRIPTION OF THE DRAWINGS

In the drawings:

FIG. 3 is a cross sectional view of a leak simulator waveguide head.

DESCRIPTION OF THE PREFERRED EMBODIMENT

Referring to the several figures, where like numerals designate like or similar features, there is shown a device for externally coupling leak-generated structure-borne sound wave disturbances to pressure vessel components to provide a leak simulation device. The leak simulation device generally designated as (10) allows for calibration, trouble-shooting, and overall checkout of an existing acoustic leak detection system known in the art, for example, as described in U.S. Pat. No. 4,858,462, which is hereby incorporated by reference, by enabling the creation of artificial leaks at strategic locations. The present invention also enables the establishment of sensor spacings in new applications and set-up.

When a leak develops in a pressurized structure (12), the pressurized substance, whether it is a gas or some other fluid, exits to the lower pressure side of the structure in a turbulent manner. The associated turbulence at the leak orifice generates broad band structure-borne sound wave disturbances within the structure wall.

The present invention resides in a device and method for externally coupling structure-borne leak generated sound waves to a pressure vessel. Thus, the device allows for the nondestructive simulation of pressure vessel leaks.

Figure 1:
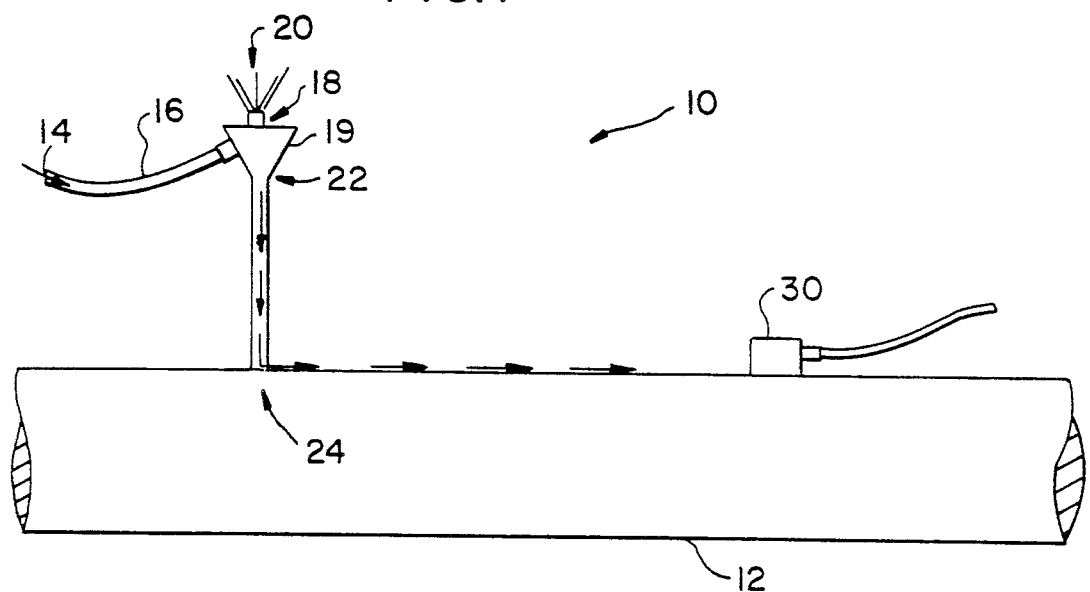
FIG. 1 is a side view with portions removed of a schematic diagram of an acoustic emission leak simulator in accordance with the present invention.
Figure 2:
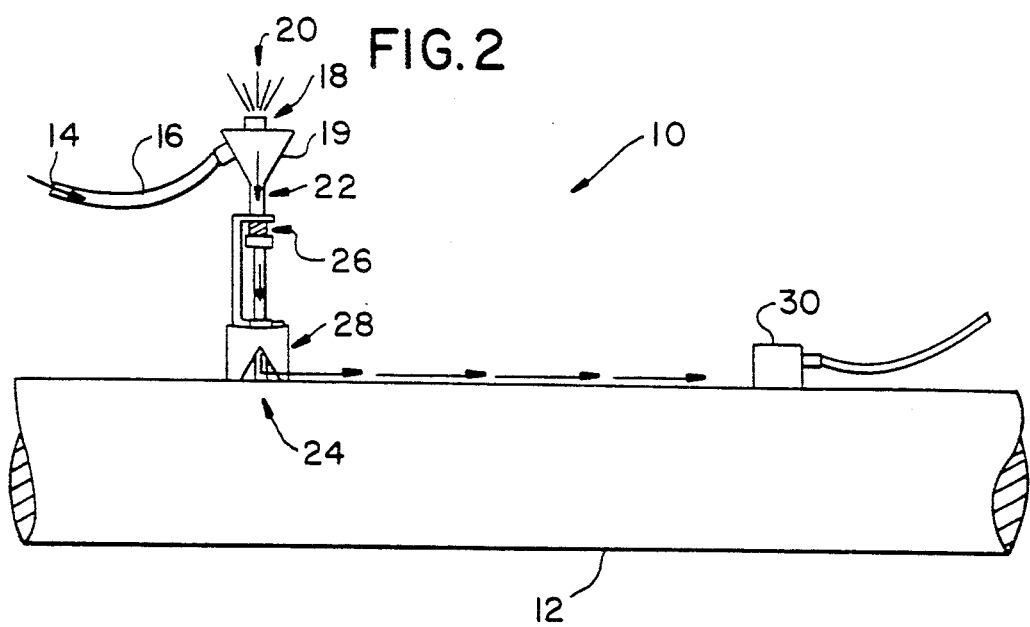
FIG. 2 is a side view similar to FIG. 1 of another embodiment of the present invention.

In FIGS. 1 and 2, a regulated compressed gas or fluid depicted by arrow (14) from a fluid supply (not shown) is supplied by a high pressure hose (16) to a variable size interchangeable orifice (18) in waveguide head (19). The fluid supply may be any regulated compressed fluids such as gas or liquid or even steam, for example, compressed nitrogen. The variable size interchangeable orifice (18) may be any variable means which controllably releases some or all of the fluid from the fluid supply so as to create a simulated leak source (20) as the fluid escapes the nozzle or orifice (18). Sound waves generated from the leak source (20) are propagated down an acoustic waveguide (22) and coupled to the pressure vessel structure (12) at the tip (24) of the acoustic waveguide (22).

Preferably, the acoustic waveguide (22) is welded to the structure (12) to offer superior performance for permanent installations. The shank (22) of the acoustic waveguide is preferably $\frac{1}{4}''$ carbon steel rod although any suitable material is employable. The waveguide shank should for optimum acoustic coupling have a diameter of about one wavelength of sound in the given structure. The cone or head (19) is an integral portion of the shank (22) of the acoustic waveguide. However, it is not required to be integral only connected thereto for transmitting sound waves. The waveguide cone serves as a smooth transition from the waveguide shank to a surface of adequate area to employ the leak orifice and fluid input connections.

Where portability is desirable, another embodiment employs a pressure-coupling method utilizing a spring loaded fixture (26) surrounding the waveguide (22) for cushioning the initial shock held to the structure (12) by a suitably sized magnet (28).

FIG. 3 is a sectional view of the acoustic waveguide head (19). Axially aligned with the shank (22) is an aperture (21) which may be threaded for nozzle plug interchangeability. This provides a variable leak orifice size. Operatively connected thereto at an angle is another aperture (23) for providing pressurized fluid input. Aperture (23) preferably accepts a $\frac{1}{4}''$ National Pipe Thread (NPT) coupling. The pressure connectors, hose (16), as well as the other components should be capable of handling pressures ranging from 50 up to 1000 psi. Normally, the pressure does not exceed 750 psi.

In operation, the sound waves generated from the simulated leak source (20) propagate along the acoustic waveguide (22) to the tip of the waveguide (24) and are coupled to the structure (12). They propagate along the structure (12) in simulation of actual leak signals as shown by the arrows in FIGS. 1 and 2 in the structure (12). These signals are detected by piezoelectric transducers (30) which send the leak signals to a standard signal processing system such as an existing acoustic leak detection system or a computer where they are evaluated, calibrated, and characterized. The detection means is actually incorporated as part of the existing systems to be calibrated. In this fashion the existing systems detection capability to detect actual leaks is tested through the use of the present invention. Portable detection means may also be employed with the present invention where portability is desirable.

In the above fashion, an existing acoustic leak detection system is then evaluated or calibrated which includes troubleshooting and an overall checkout of the system. In new applications, the data obtained from the simulated leak detection system is utilized for the establishment of sensor spacing.

The present invention is portable and nondestructive. It offers a simple method of leak simulation with variable orifice sizes being available through orifice plug interchangeability. This device offers a realistic representation of an actual leak since the escaping gas creates the sound waves. Any pressurized substance is usable as the fluid source applies, such as compressed gas, steam, water, etc. In many cases, it is envisionable that the actual pressurized substance contained in the pressure vessel could be utilized to drive the leak simulator to realize the closest representation of an actual leak.

While a specific embodiment of the present invention has been shown and described in detail to illustrate the application and principles of the invention, it will be understood that it is not intended that the present invention be limited thereto and that the invention may be embodied otherwise without departing from such principles.

One such example is to permanently install the waveguide leak simulator and utilize it as both an AE receiver waveguide (an AE sensor can be attached directly to the waveguide) and a structure-borne leak simulator. In this fashion, a check or calibration point is available at each sensor location.

We claim:

1. An acoustic emission leak simulator, comprising:
   a fluid supply;
   variable means for controllably releasing the fluid from the fluid supply for creating a simulated leak source;
   an acoustic waveguide connected to said variable means for receiving sound waves generated therefrom, the acoustic waveguide coupling the sound waves through a waveguide shank into a structure for simulation of a leak signal, said waveguide shank having a diameter of about one wavelength of sound in the structure;
   means for detecting the leak signal in the structure, said detecting means being positioned at a predetermined distance from the waveguide shank; and
   signal processing means in communication with said detecting means for characterizing the detected leak signal.

2. An apparatus as recited in claim 1, wherein said variable means includes a variable size interchangeable orifice.

3. An apparatus as recited in claim 1, wherein said waveguide shank is welded to the structure.

4. An apparatus as recited in claim 1, wherein said detecting means includes at least one piezoelectric transducer.

5. An acoustic emission leak simulator, comprising:
   a fluid supply;
   variable means for controllably releasing the fluid from the fluid supply for creating a simulated leak source;
   an acoustic waveguide connected to said variable means for receiving sound waves generated therefrom, the acoustic waveguide coupling the sound waves through a waveguide shank into a structure for simulation of a leak signal; and
   resilient means for securing said acoustic waveguide to the structure.

6. An apparatus as recited in claim 5, wherein said resilient means includes a magnet for holding the acoustic waveguide to the structure.

7. A method for nondestructive simulation of a leak in a structure, comprising the steps of:

provided a fluid supply;

releasing fluid from the fluid supply to generate a simulated leak source;

coupling an acoustic waveguide with a waveguide shank to the simulated leak source for propagating sound waves along the waveguide shank into the structure;

detecting the leak signal in the structure with a transducer positioned at a predetermined distance from the waveguide shank; and securing the acoustic waveguide shank to the structure in a resilient manner.

8. A method as recited in claim 7, wherein the coupling step includes welding an acoustic waveguide to the structure.

9. A method as recited in claim 7, wherein the coupling step includes mounting the acoustic waveguide to the structure with a magnet.

* * * * *